(12) United States Patent
Wang et al.

(10) Patent No.: US 10,775,927 B2
(45) Date of Patent: Sep. 15, 2020

(54) CALCULATION OF TOUCH COORDINATES USING MIXED PROCESSING OF MUTUAL CAPACITANCE SENSING DATA AND SELF CAPACITANCE SENSING DATA

(71) Applicant: STMicroelectronics Asia Pacific Pte Ltd, Singapore (SG)

(72) Inventors: Youngjin Wang, Seoul (KR); Tae-gil Kang, Seoul (KR)

(73) Assignee: STMicroelectronics Asia Pacific Pte Ltd, Singapore (SG)

(*) Notice: Subject to any disclaimer, the term of this patent is extended or adjusted under 35 U.S.C. 154(b) by 165 days.

(21) Appl. No.: 16/055,922

(22) Filed: Aug. 6, 2018

(65) Prior Publication Data

US 2019/0050079 A1  Feb. 14, 2019

Related U.S. Application Data

(60) Provisional application No. 62/545,171, filed on Aug. 14, 2017.

(51) Int. Cl.
*G06F 3/041* (2006.01)
*G06F 3/044* (2006.01)

(52) U.S. Cl.
CPC ...... *G06F 3/041662* (2019.05); *G06F 3/0418* (2013.01); *G06F 3/0443* (2019.05); *G06F 3/0446* (2019.05)

(58) Field of Classification Search
CPC ......... G06F 3/044–0448; G06F 3/0416–04186
See application file for complete search history.

(56) References Cited

U.S. PATENT DOCUMENTS

| | | | |
|---|---|---|---|
| 9,684,418 B1* | 6/2017 | Hills | G01N 27/22 |
| 9,904,427 B1* | 2/2018 | Co | G06F 3/044 |
| 10,095,341 B2* | 10/2018 | Solven | G06F 3/0414 |
| 10,108,303 B2* | 10/2018 | Shepelev | G06F 3/044 |
| 2010/0315372 A1 | 12/2010 | Ng | |
| 2017/0255295 A1* | 9/2017 | Tanemura | G06F 3/044 |
| 2017/0285797 A1* | 10/2017 | Shepelev | G06F 3/044 |
| 2018/0004332 A1* | 1/2018 | Solven | G06F 3/0414 |
| 2018/0032170 A1* | 2/2018 | Shaik | G06F 3/044 |
| 2019/0050079 A1* | 2/2019 | Wang | G06F 3/044 |
| 2019/0056823 A1* | 2/2019 | Stevenson | G06F 3/044 |

* cited by examiner

*Primary Examiner* — Patrick F Marinelli
(74) *Attorney, Agent, or Firm* — Crowe & Dunlevy

(57) ABSTRACT

A data frame in a touch capacitive sensing circuit includes both mutual capacitance data and self capacitance data. The mutual capacitance data and self capacitance data of the frame are filtered to define mutual capacitance and self capacitance islands. Centroids of the mutual capacitance and self capacitance islands are calculated and then processed in a weighted mixing operation to produce a hybrid centroid that more accurately locates the coordinates of a detected touch/hover.

26 Claims, 8 Drawing Sheets

|    | 21 | 22 | 23  | 24  | 25  | 26  | 27  | 28  | 29 | 30 |
|----|----|----|-----|-----|-----|-----|-----|-----|----|----|
| 5  | 0  | 0  | 0   | 0   | 0   | 0   | 0   | 0   | 0  | 0  |
| 6  | -3 | 0  | -12 | -25 | -21 | -21 | -24 | -14 | 6  | 3  |
| 7  | 1  | 2  | -21 | 40  | 215 | 143 | -22 | -52 | 1  | 2  |
| 8  | 3  | 6  | 61  | 257 | 217 | 238 | 240 | -23 | -8 | -7 |
| 9  | 8  | 17 | 293 | 183 | 82  | 101 | 205 | 329 | 46 | -6 |
| 10 | 7  | 12 | 107 | 209 | 122 | 144 | 241 | 273 | 34 | -5 |
| 11 | 3  | 3  | -63 | 21  | 223 | 215 | 146 | -6  | 13 | 4  |
| 12 | 0  | 1  | -15 | -33 | -29 | -26 | -21 | -14 | 6  | 0  |
| 13 | 0  | 0  | 0   | 0   | 0   | 0   | 0   | 0   | 0  | 0  |

FIG. 2A
(Prior Art)

|    | 21 | 22 | 23  | 24  | 25  | 26  | 27  | 28  | 29 | 30 |
|----|----|----|-----|-----|-----|-----|-----|-----|----|----|
| 5  | 0  | 0  | 0   | 0   | 0   | 0   | 0   | 0   | 0  | 0  |
| 6  | 0  | 0  | 0   | 0   | 0   | 0   | 0   | 0   | 0  | 0  |
| 7  | 0  | 0  | 0   | 0   | 215 | 143 | 0   | 0   | 0  | 0  |
| 8  | 0  | 0  | 61  | 257 | 217 | 238 | 240 | 0   | 0  | 0  |
| 9  | 0  | 0  | 293 | 183 | 82  | 101 | 205 | 329 | 0  | 0  |
| 10 | 0  | 0  | 107 | 209 | 122 | 144 | 241 | 273 | 0  | 0  |
| 11 | 0  | 0  | 0   | 0   | 223 | 215 | 146 | 0   | 0  | 0  |
| 12 | 0  | 0  | 0   | 0   | 0   | 0   | 0   | 0   | 0  | 0  |
| 13 | 0  | 0  | 0   | 0   | 0   | 0   | 0   | 0   | 0  | 0  |

FIG. 2B
(Prior Art)

|    | 21 | 22 | 23  | 24  | 25  | 26  | 27  | 28  | 29 | 30 |
|----|----|----|-----|-----|-----|-----|-----|-----|----|----|
| 5  | 0  | 0  | 0   | 0   | 0   | 0   | 0   | 0   | 0  | 0  |
| 6  | 0  | 0  | 0   | 0   | 0   | 0   | 0   | 0   | 0  | 0  |
| 7  | 0  | 0  | 0   | 0   | 215 | 143 | 0   | 0   | 0  | 0  |
| 8  | 0  | 0  | 61  | 257 | 217 | 238 | 240 | 0   | 0  | 0  |
| 9  | 0  | 0  | 293 | 183 | 82  | 101 | 205 | 329 | 0  | 0  |
| 10 | 0  | 0  | 107 | 209 | 122 | 144 | 241 | 273 | 0  | 0  |
| 11 | 0  | 0  | 0   | 0   | 223 | 215 | 146 | 0   | 0  | 0  |
| 12 | 0  | 0  | 0   | 0   | 0   | 0   | 0   | 0   | 0  | 0  |
| 13 | 0  | 0  | 0   | 0   | 0   | 0   | 0   | 0   | 0  | 0  |

|    | 21 | 22 | 23  | 24  | 25  | 26  | 27  | 28  | 29 | 30 |
|----|----|----|-----|-----|-----|-----|-----|-----|----|----|
| 5  | 0  | 0  | 0   | 0   | 0   | 0   | 0   | 0   | 0  | 0  |
| 6  | 0  | 0  | 0   | 0   | 0   | 0   | 0   | 0   | 0  | 0  |
| 7  | 0  | 0  | 0   | 0   | 215 | 143 | 0   | 0   | 0  | 0  |
| 8  | 0  | 0  | 61  | 257 | 217 | 238 | 240 | 0   | 0  | 0  |
| 9  | 0  | 0  | 293 | 183 | 82  | 101 | 205 | 329 | 0  | 0  |
| 10 | 0  | 0  | 107 | 209 | 122 | 144 | 241 | 273 | 0  | 0  |
| 11 | 0  | 0  | 0   | 0   | 223 | 215 | 146 | 0   | 0  | 0  |
| 12 | 0  | 0  | 0   | 0   | 0   | 0   | 0   | 0   | 0  | 0  |
| 13 | 0  | 0  | 0   | 0   | 0   | 0   | 0   | 0   | 0  | 0  |

|    | 21 | 22 | 23   | 24   | 25   | 26   | 27   | 28   | 29  | 30 |
|----|----|----|------|------|------|------|------|------|-----|----|
| 5  | 0  | 0  | 0    | 0    | 0    | 0    | 0    | 0    | 0   | 0  |
| 6  | -1 | -3 | -7   | -18  | -17  | -18  | -21  | -15  | 4   | 5  |
| 7  | 1  | 3  | 10   | 48   | 215  | 148  | 2    | -43  | 7   | 3  |
| 8  | 3  | 9  | 74   | 350  | 341  | 354  | 326  | 14   | -2  | -1 |
| 9  | 5  | 15 | 316  | 292  | 198  | 210  | 293  | 390  | 82  | 4  |
| 10 | 7  | 13 | 137  | 219  | 122  | 138  | 223  | 322  | 61  | -3 |
| 11 | 0  | -7 | -128 | -186 | -1   | 39   | 50   | -93  | -10 | -5 |
| 12 | -4 | -3 | -62  | -180 | -197 | -186 | -158 | -115 | -8  | -5 |
| 13 | -5 | 0  | -14  | -48  | -56  | -49  | -46  | -38  | -4  | -3 |

FIG. 3A
(Prior Art)

|    | 21 | 22 | 23  | 24  | 25  | 26  | 27  | 28  | 29 | 30 |
|----|----|----|-----|-----|-----|-----|-----|-----|----|----|
| 5  | 0  | 0  | 0   | 0   | 0   | 0   | 0   | 0   | 0  | 0  |
| 6  | 0  | 0  | 0   | 0   | 0   | 0   | 0   | 0   | 0  | 0  |
| 7  | 0  | 0  | 0   | 0   | 215 | 148 | 0   | 0   | 0  | 0  |
| 8  | 0  | 0  | 74  | 350 | 341 | 354 | 326 | 0   | 0  | 0  |
| 9  | 0  | 0  | 316 | 292 | 198 | 210 | 293 | 390 | 82 | 0  |
| 10 | 0  | 0  | 137 | 219 | 122 | 138 | 223 | 322 | 61 | 0  |
| 11 | 0  | 0  | 0   | 0   | 0   | 0   | 0   | 0   | 0  | 0  |
| 12 | 0  | 0  | 0   | 0   | 0   | 0   | 0   | 0   | 0  | 0  |
| 13 | 0  | 0  | 0   | 0   | 0   | 0   | 0   | 0   | 0  | 0  |

FIG. 3B
(Prior Art)

|    | 21 | 22 | 23  | 24  | 25  | 26  | 27  | 28  | 29 | 30 |
|----|----|----|-----|-----|-----|-----|-----|-----|----|----|
| 5  | 0  | 0  | 0   | 0   | 0   | 0   | 0   | 0   | 0  | 0  |
| 6  | 0  | 0  | 0   | 0   | 0   | 0   | 0   | 0   | 0  | 0  |
| 7  | 0  | 0  | 0   | 0   | 215 | 148 | 0   | 0   | 0  | 0  |
| 8  | 0  | 0  | 74  | 350 | 341 | 354 | 326 | 0   | 0  | 0  |
| 9  | 0  | 0  | 316 | 292 | 198 | 210 | 293 | 390 | 82 | 0  |
| 10 | 0  | 0  | 137 | 219 | 122 | 138 | 223 | 322 | 61 | 0  |
| 11 | 0  | 0  | 0   | 0   | 0   | 0   | 0   | 0   | 0  | 0  |
| 12 | 0  | 0  | 0   | 0   | 0   | 0   | 0   | 0   | 0  | 0  |
| 13 | 0  | 0  | 0   | 0   | 0   | 0   | 0   | 0   | 0  | 0  |

|    | 21 | 22 | 23  | 24  | 25  | 26  | 27  | 28  | 29 | 30 |
|----|----|----|-----|-----|-----|-----|-----|-----|----|----|
| 5  | 0  | 0  | 0   | 0   | 0   | 0   | 0   | 0   | 0  | 0  |
| 6  | 0  | 0  | 0   | 0   | 0   | 0   | 0   | 0   | 0  | 0  |
| 7  | 0  | 0  | 0   | 0   | 215 | 148 | 0   | 0   | 0  | 0  |
| 8  | 0  | 0  | 74  | 350 | 341 | 354 | 326 | 0   | 0  | 0  |
| 9  | 0  | 0  | 316 | 292 | 198 | 210 | 293 | 390 | 82 | 0  |
| 10 | 0  | 0  | 137 | 219 | 122 | 138 | 223 | 322 | 61 | 0  |
| 11 | 0  | 0  | 0   | 0   | 0   | 0   | 0   | 0   | 0  | 0  |
| 12 | 0  | 0  | 0   | 0   | 0   | 0   | 0   | 0   | 0  | 0  |
| 13 | 0  | 0  | 0   | 0   | 0   | 0   | 0   | 0   | 0  | 0  |

| | SR | 21 | 22 | 23 | 24 | 25 | 26 | 27 | 28 | 29 | 30 |
|---|---|---|---|---|---|---|---|---|---|---|---|
| SC | | -13 | -6 | 166 | 573 | 674 | 669 | 595 | 418 | 41 | -23 |
| 5 | 24 | 0 | 0 | 0 | 0 | 0 | 0 | 0 | 0 | 0 | 0 |
| 6 | 37 | -1 | -3 | -7 | -18 | -17 | -18 | -21 | -15 | 4 | 5 |
| 7 | 155 | 1 | 3 | 10 | 48 | 215 | 148 | 2 | -43 | 7 | 3 |
| 8 | 734 | 3 | 9 | 74 | 350 | 341 | 354 | 326 | 14 | -2 | -1 |
| 9 | 938 | 5 | 15 | 316 | 292 | 198 | 210 | 293 | 390 | 82 | 4 |
| 10 | 1054 | 7 | 13 | 137 | 219 | 122 | 138 | 223 | 322 | 61 | -3 |
| 11 | 817 | 0 | -7 | -128 | -186 | -1 | 39 | 50 | -93 | -10 | -5 |
| 12 | 292 | -4 | -3 | -62 | -180 | -197 | -186 | -158 | -115 | -8 | -5 |
| 13 | 47 | -5 | 0 | -14 | -48 | -56 | -49 | -46 | -38 | -4 | -3 |
| 14 | 10 | 0 | 0 | 0 | 0 | 0 | 0 | 0 | 0 | 0 | 0 |

FIG. 5A

| | SR | 21 | 22 | 23 | 24 | 25 | 26 | 27 | 28 | 29 | 30 |
|---|---|---|---|---|---|---|---|---|---|---|---|
| SC | | 0 | 0 | 166 | 573 | 674 | 669 | 595 | 418 | 41 | 0 |
| 5 | 0 | 0 | 0 | 0 | 0 | 0 | 0 | 0 | 0 | 0 | 0 |
| 6 | 37 | 0 | 0 | 0 | 0 | 0 | 0 | 0 | 0 | 0 | 0 |
| 7 | 155 | 0 | 0 | 0 | 0 | 215 | 148 | 0 | 0 | 0 | 0 |
| 8 | 734 | 0 | 0 | 74 | 350 | 341 | 354 | 326 | 0 | 0 | 0 |
| 9 | 938 | 0 | 0 | 316 | 292 | 198 | 210 | 293 | 390 | 82 | 0 |
| 10 | 1054 | 0 | 0 | 137 | 219 | 122 | 138 | 223 | 322 | 61 | 0 |
| 11 | 817 | 0 | 0 | 0 | 0 | 0 | 0 | 0 | 0 | 0 | 0 |
| 12 | 292 | 0 | 0 | 0 | 0 | 0 | 0 | 0 | 0 | 0 | 0 |
| 13 | 47 | 0 | 0 | 0 | 0 | 0 | 0 | 0 | 0 | 0 | 0 |
| 14 | 0 | 0 | 0 | 0 | 0 | 0 | 0 | 0 | 0 | 0 | 0 |

| | SR | 21 | 22 | 23 | 24 | 25 | 26 | 27 | 28 | 29 | 30 |
|---|---|---|---|---|---|---|---|---|---|---|---|
| SC | | _0_ | _0_ | _166_ | _573_ | _674_ | _669_ | _595_ | _418_ | _41_ | _0_ |
| 5 | _0_ | 0 | 0 | 0 | 0 | 0 | 0 | 0 | 0 | 0 | 0 |
| 6 | _37_ | 0 | 0 | 0 | 0 | 0 | 0 | 0 | 0 | 0 | 0 |
| 7 | _155_ | 0 | 0 | 0 | 0 | 215 | 148 | 0 | 0 | 0 | 0 |
| 8 | _734_ | 0 | 0 | 74 | 350 | 341 | 354 | 326 | 0 | 0 | 0 |
| 9 | _938_ | 0 | 0 | 316 | 292 | 198 | 210 | 293 | 390 | 82 | 0 |
| 10 | _1054_ | 0 | 0 | 137 | 219 | 122 | 138 | 223 | 322 | 61 | 0 |
| 11 | _817_ | 0 | 0 | 0 | 0 | 0 | 0 | 0 | 0 | 0 | 0 |
| 12 | _292_ | 0 | 0 | 0 | 0 | 0 | 0 | 0 | 0 | 0 | 0 |
| 13 | _47_ | 0 | 0 | 0 | 0 | 0 | 0 | 0 | 0 | 0 | 0 |
| 14 | _0_ | 0 | 0 | 0 | 0 | 0 | 0 | 0 | 0 | 0 | 0 |

FIG. 5D

| | SR | 21 | 22 | 23 | 24 | 25 | 26 | 27 | 28 | 29 | 30 |
|---|---|---|---|---|---|---|---|---|---|---|---|
| SC | | _0_ | _0_ | _166_ | _573_ | _674_ | _669_ | _595_ | _418_ | _41_ | _0_ |
| 5 | _0_ | 0 | 0 | 0 | 0 | 0 | 0 | 0 | 0 | 0 | 0 |
| 6 | _37_ | 0 | 0 | 0 | 0 | 0 | 0 | 0 | 0 | 0 | 0 |
| 7 | _155_ | 0 | 0 | 0 | 0 | 215 | 148 | 0 | 0 | 0 | 0 |
| 8 | _734_ | 0 | 0 | 74 | 350 | 341 | 354 | 326 | 0 | 0 | 0 |
| 9 | _938_ | 0 | 0(60) | 316 | 292 | 198 | 210 | 293 | 390 | 82 | 0 |
| 10 | _1054_ | 0 | 0 | 137 | 219 | 122 | 138 | 223 | 322 | 61 | 0 |
| 11 | _817_ | 0 | 0 | 0 | 0 | 0 | 0 | 0 | 0 | 0 | 0 |
| 12 | _292_ | 0 | 0 | 0 | 0 | 0 | 0 | 0 | 0 | 0 | 0 |
| 13 | _47_ | 0 | 0 | 0 | 0 | 0 | 0 | 0 | 0 | 0 | 0 |
| 14 | _0_ | 0 | 0 | 0 | 0 | 0 | 0 | 0 | 0 | 0 | 0 |

CALCULATION OF TOUCH COORDINATES USING MIXED PROCESSING OF MUTUAL CAPACITANCE SENSING DATA AND SELF CAPACITANCE SENSING DATA

CROSS-REFERENCE TO RELATED APPLICATION

This application is claims priority to United States Provisional Application for Patent No. 62/545,171 filed Aug. 14, 2017, the disclosure of which is incorporated by reference.

TECHNICAL FIELD

The present disclosure generally relates to capacitive sensing panels and, more particularly, to a process for calculating touch coordinates in situations where the mutual capacitance data is perturbed by crosstalk arising from multiple simultaneous touches.

BACKGROUND

Touchscreen panels are typically incorporated in various electronic devices to detect a user input (for example, a user touch or hover) and to display content. The touchscreen panels function to both display content through a display panel and detect the user touch/hover through a capacitive sensing panel. The capacitive sensing panel is typically mounted on top of the display panel. The display panel may utilize any of a number of display technologies including LED, LCD, OLED, etc. The capacitive sensing panel includes multiple layers of capacitive sensing circuitry arranged in a pattern. For example, as shown in FIG. 1, a diamond-shaped pattern is one well known sensor pattern wherein rows 10 of interconnected diamond-shaped structures 12 are interleaved with columns 14 of interconnected diamond-shaped structures 16. A small portion of such a capacitive sensing panel with a 3×3 array arrangement is shown in FIG. 1. A first set of lines 20 are connected to the rows and a second set of lines 22 are connected to the columns. The lines 20 and 22 are coupled to a touch screen controller (TSC) circuit 26 that includes both drive circuitry and sense circuitry. The drive circuitry is used to apply a signal to individual ones or groups of lines 20 and 22 and the sense circuit is used to sense a signal at individual ones or groups of lines 20 and 22.

It is known in the art to operate the capacitive sensing panel in at least two distinct modes.

In a first mode, referred to herein as a self capacitance sensing mode, the TSC circuit 26 operates to sense the self capacitance between any given row 10 or column 14 and a panel reference. By sensing a change in self-capacitance for a given row 10 or column 14, the TSC circuit 26 can detect a user touch or hover at or near that given row or column.

In a second mode, referred to herein as a mutual capacitance sensing mode, the TSC circuit 26 operates to sense the mutual capacitance at an intersection point between each row 10 and column 12. By sensing a change in mutual capacitance at a given intersection point between a row and column, the TSC circuit 26 can detect a user touch or hover at or near that given intersection point.

The technique for processing the collected capacitance data to determine touch/hover location typically uses the steps of: a) filtering the collected capacitance data using a fixed threshold; b) defining an island which includes only the capacitance data which exceeds the fixed threshold; and c) calculating a centroid of the defined island which provides coordinates of the detected touch/hover.

An example of the implementation of this process for a collected frame of mutual capacitance data is shown in FIGS. 2A-2D. To collect this mutual capacitance data, the TSC circuit 26 uses the drive circuitry to sequentially apply an AC signal to each line 20 for the rows 10, and uses the sense circuitry coupled to each line 22 to sense mutual capacitance at intersection points between rows 10 and columns 12. One complete scan of the rows and columns produces a frame of mutual capacitance data which represents the sensed capacitance at each intersection point between a row 10 and column 12. In the example of FIG. 2A, only a subset of the mutual sensing capacitance data is shown for rows 5-13 and columns 21-30 of the capacitive sensing panel (it being understood that the capacitive sensing panel may include many tens or even hundreds of rows and columns). The next step in the process is filtering the mutual capacitance data using a fixed filter threshold. In this case, a filter threshold of 55, for example, is used and all mutual capacitance data in the frame having a value below the threshold is set to 0 as shown in FIG. 2B. The remaining mutual capacitance data after filtering defines a data island having a boundary 30 as shown in FIG. 2C. Next, the centroid X of the data island is calculated to generate the coordinates of the detected touch/hover as shown in FIG. 2D. The coordinates of the centroid X in this example are $P_{sffg}=(25.6, 9.13)$.

The mathematical process used for defining the data island and calculating its centroid is well known to those skilled in the art.

It is important to note that the mutual capacitance data for the example of FIGS. 2A-2D concerns just a single touch of the panel. The reference above to "sffg" means "single finger floating ground" which simply indicates that the calculated touch centroid P relates to a single (one) finger touch. In the floating ground condition, however, the mutual sensing capacitance data will be distorted by crosstalk in situations where multiple simultaneous touches of the panel occur. This is illustrated in the example of FIGS. 3A-3D. Assume for this example that the same touch as produced the capacitance data of FIG. 2A is made along with a second touch on the panel at a location some distance away (not explicitly shown). Again, the TSC circuit 26 collects the mutual capacitance data. One complete scan of the rows and columns produces a frame of mutual capacitance data which represents the sensed mutual capacitance at each intersection point between a row 10 and column 12. Again, in the example of FIG. 3A, only a subset of the mutual sensing capacitance data is shown for rows 5-13 and columns 21-30 of the capacitive sensing panel which may include many rows and columns. It will be noted that even though the touch is at the same location the values of the mutual capacitance data of FIG. 3A differ from values of the mutual capacitance data of FIG. 2A due to the crosstalk introduced by the presence of the second touch (located some distance away; not explicitly shown). The next step in the process is filtering the capacitance data using a fixed threshold. In this case, the same filter threshold of 55, for example, is used and all mutual capacitance data in the frame having a value below the threshold is set to 0 as shown in FIG. 3B. The remaining mutual capacitance data after filtering defines a data island having a boundary 30 as shown in FIG. 3C. Next, the centroid X of the data island is calculated to generate the coordinates of the detected touch/hover as shown in FIG. 3D. The coordinates of the centroid X in this example are $P_{dffg}=(25.7, 8.75)$. The reference to "dffg" means "double finger floating ground" which simply indicates that the calculated touch centroid P relates to a double (two) finger touch.

The calculated coordinates for the centroid $P_{dffg}$=(25.7, 8.75) in the double finger scenario clearly differ from the calculated coordinates for the centroid $P_{sffg}$=(25.6, 9.13) in the single finger scenario. It is thus clear that the crosstalk distortion of the mutual sensing capacitance data produces an error in the calculated coordinates for the touch. There is a need in the art to address this issue.

SUMMARY

In an embodiment, a method for processing a frame including mutual capacitance data and self capacitance data comprises: filtering the mutual capacitance data of the frame using a first fixed threshold to define a mutual capacitance island which includes only the mutual capacitance data which exceeds the first fixed threshold; filtering the self capacitance data of the frame using a second fixed threshold to define a row self capacitance island and a column self capacitance island which include only the self capacitance data which exceeds the second fixed threshold; calculating a first centroid of the mutual capacitance island; calculating a second centroid of the row and column self capacitance islands; and weighted mixing of the first and second centroids to calculate a hybrid centroid which provides coordinates of a detected touch/hover.

The foregoing and other features and advantages of the present disclosure will become further apparent from the following detailed description of the embodiments, read in conjunction with the accompanying drawings. The detailed description and drawings are merely illustrative of the disclosure, rather than limiting the scope of the invention as defined by the appended claims and equivalents thereof.

BRIEF DESCRIPTION OF DRAWINGS

Embodiments are illustrated by way of example in the accompanying figures not necessarily drawn to scale, in which like numbers indicate similar parts, and in which:

FIGS. 2A-2D show the process implemented by the control circuit in FIG. 1 for touch coordinate determination in a single touch floating ground condition;

FIGS. 3A-3D show the error introduced in the touch coordinate determination by the control circuit of FIG. 1 in a double touch floating ground condition;

FIGS. 5A-5D show the process implemented by the control circuit in FIG. 4 for touch coordinate determination using mixed processing of mutual capacitance data and self capacitance data.

DETAILED DESCRIPTION

Figure 1:
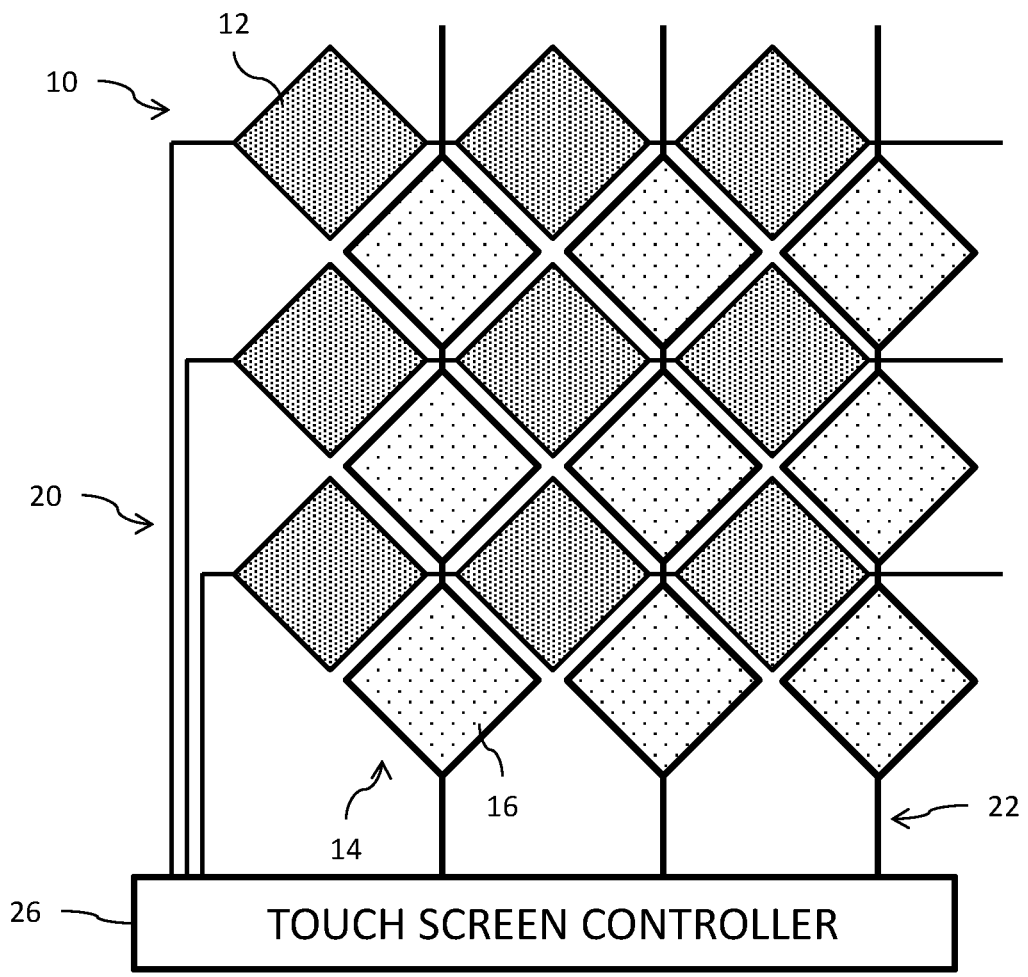
FIG. 1 shows a capacitive sensing panel and control circuit in a prior art configuration.
Figure 4:
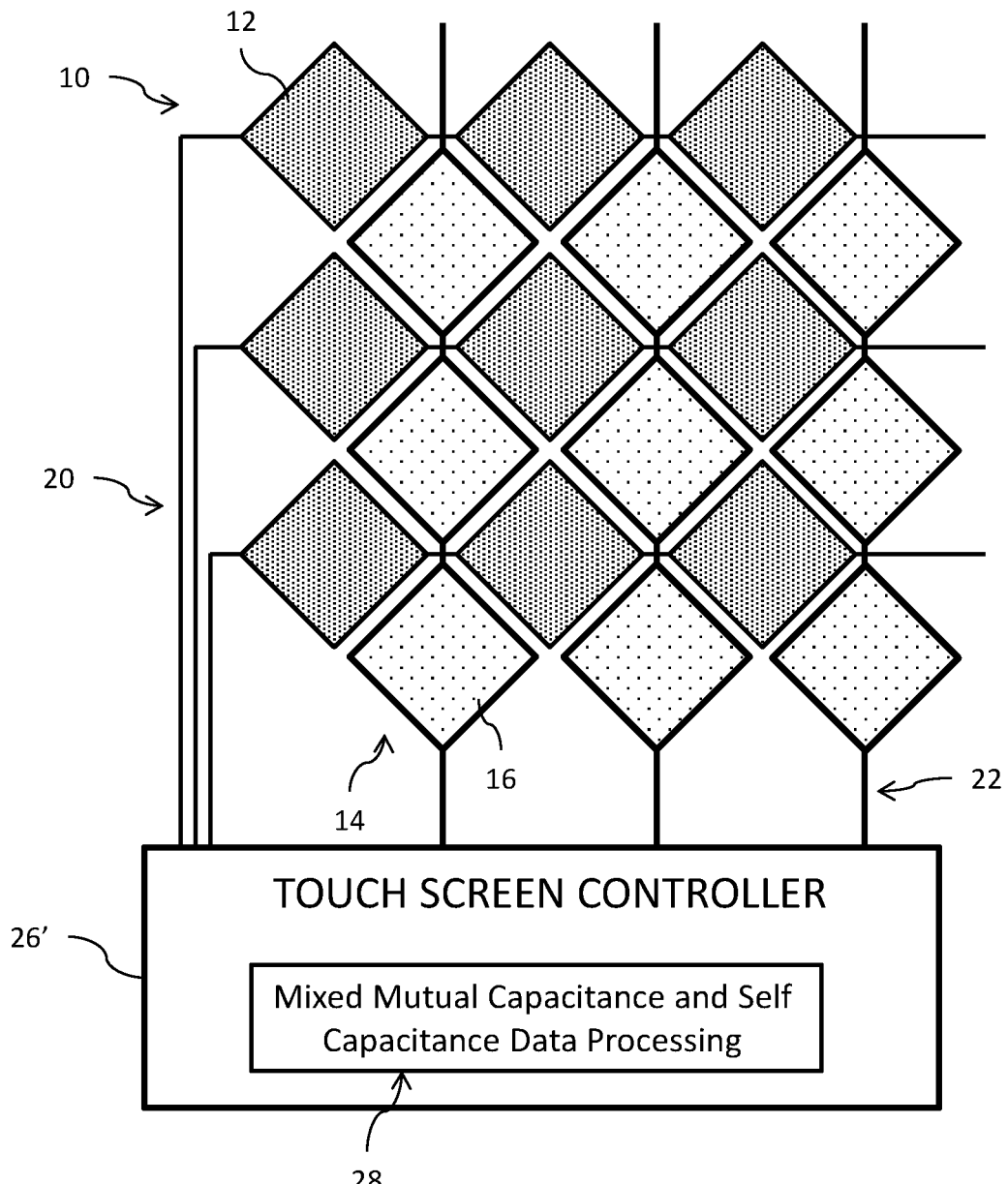
FIG. 4 shows a capacitive sensing panel and control circuit implementing a process for touch coordinate calculation using mixed processing of mutual capacitance data and self capacitance data.

FIG. 4 shows a capacitive sensing panel and control circuit 26'. The control circuit 26' in FIG. 4 differs from the control circuit 26 in FIG. 1 in that the control circuit 26' executes a data processing technique 28 for mixed processing of mutual capacitance data and self capacitance data to address the problem of introduced error in the calculated coordinates for the touch in the double touch floating ground scenario described above. The improved process for touch coordinate calculation as disclosed herein advantageously processes both mutual capacitance data and self capacitance data for touch coordinate calculation.

Using the control circuit 26', in accordance with operations well known to those skilled in the art and as generally discussed herein, mutual capacitance data and self capacitance data are collected. The technique for processing the collected capacitance data to determine touch/hover location in accordance with the improved process herein uses the steps of: a) filtering the mutual capacitance data using a first fixed threshold and filtering the self capacitance data using a second fixed threshold; b) defining a mutual capacitance island which includes only the mutual capacitance data which exceeds the first fixed threshold and defining two self capacitance islands (one for the rows and one for the columns) which include only the self capacitance data which exceeds the second fixed threshold; c) calculating a first centroid of the defined mutual capacitance island and calculating a second centroid of the defined self capacitance islands; d) measuring a mutual area for the mutual capacitance island; e) measuring a self crossing area for the two self capacitance islands; f) defining a mutual weight and a self weight as a function of the mutual area and the self crossing area; g) mixing the first and second centroids as a function of the mutual weight and the self weight to calculate a hybrid centroid which provides coordinates of the detected touch/hover.

An example of the implementation of this process for a collected frame of mutual capacitance data and self capacitance data is shown in FIGS. 5A-5D. To collect the mutual capacitance data, the TSC circuit 26' uses the drive circuitry to sequentially apply an AC signal to each line 20 for the rows 10, and uses the sense circuitry coupled to each line 22 to sense mutual capacitance at the intersection points between the rows 10 and columns 12. To collect the self capacitance data, the TSC circuit 26' uses the sense circuitry to sense self capacitance at each row line 20 and column line 22. One complete scan of the rows and columns produces a frame of mutual capacitance data and self capacitance data which represents the sensed mutual capacitance at each intersection point between a row 10 and column 12 as well as the sensed self capacitance of each row 10 and column 12. In the example of FIG. 5A, the same touch location that produced the capacitance data of FIG. 2A is made along with the same second touch on the panel at a location some distance away that produced the capacitance data of FIG. 3A. In FIG. 5A, only a subset of the mutual sensing capacitance data and self capacitance sensing data is shown for rows 5-14 and columns 21-30 of the capacitive sensing panel (it again being understood that the panel may include many rows and columns). The mutual capacitance data values are shown without underline at the intersection points of the row/column and the self capacitance data values are shown underlined (with SR indicating the self capacitance row data and SC indicating the self capacitance column data) for each row and column.

The next step in the process is filtering the mutual and self capacitance data using fixed thresholds. In this case, a first filter threshold of 55, for example, is used for the mutual capacitance data and all mutual capacitance data in the frame having a value below the first threshold is set to 0 as shown in FIG. 5B. Furthermore, a second filter threshold of 30, for example, is used for the self capacitance data and all self capacitance data in the frame having a value below the second threshold is set to 0 as also shown in FIG. 5B.

The capacitance data that remain after filtering define data islands. The remaining mutual capacitance data defines a mutual data island having a boundary 36 as shown in FIG. 5C. The remaining self capacitance data defines first and second self data islands (one for the rows and one for the columns) having boundaries 38r and 38c as also shown in FIG. 5C.

Next, the centroid X of the mutual data island is calculated to generate the coordinates of the detected touch/hover as shown in FIG. 5D. The coordinates of the mutual data island centroid X in this example are $P_{mut}$=(25.7, 8.75). As discussed above in connection with FIGS. 3A-3D with $P_{sffg}$, this mutual data island centroid X does not accurately reflect the location of the touch because the mutual capacitance data has been perturbed the simultaneous second touch in the floating ground condition. Also, the centroid χ of the self data islands is calculated to generate the coordinates of the detected touch/hover as shown in FIG. 5D. The coordinates of the self data islands centroid χ in this example are $P_{self}$=(25.8, 9.64). This self capacitance centroid likewise does not accurately reflect the location of the touch. The process disclosed herein will mix these centroids in order to obtain a more accurate touch/hover location determination.

A mutual area for the mutual capacitance island is then determined by the number of data points contained within the mutual data island after filtering. In the example of FIG. 5D, the mutual area is equal to 21. A self crossing area is then determined by the area 40 covered by the number of data points crossed by the two self capacitance data islands. In other words, the self crossing area is the product of the number of data points in the row data island (boundary 38r) and the number of data points in the column data island (boundary 38c). In the example of FIG. 5D, there are 8 data points in the row data island and 7 data points in the column data island; thus, the self crossing area is equal to 56.

In an implementation, the mutual area may equal the number of data points within the mutual capacitance island which are also located within the self crossing area 40. In the example of FIG. 5D, this different calculation of the mutual area would not make a difference. However, it is conceivable that mutual capacitance data points having values higher than the first threshold could exist outside of the self crossing area 40, and in such a case those data points would not factor into the calculation of the mutual area. As an example of this, consider that the mutual capacitance value at the intersection point between the 9$^{th}$ row and the 22$^{nd}$ column was 60 instead of 15 (see, parenthetical value (60) in FIG. 5D). This mutual capacitance value of 60 would meet the first threshold to be included within the boundary 36 for the mutual data island but would be outside of the self crossing area 40. That data point would accordingly not be included in the determination of the mutual area.

A mutual weight value is then defined as a function of the mutual area. In an example embodiment, the value of the mutual weight ($W_{mut}$) is equal to the value for the mutual area. Thus, $W_{mut}$=21.

A self weight value is then defined as a function of the mutual weight and the self crossing area. In an example embodiment, the value of the self weight ($W_{self}$) is equal to the self crossing area minus the mutual weight value. Thus, $W_{self}$=56−21=28.

The foregoing illustrates just one example of a weight value selection technique. The goal of the weight value selection process is to choose weight values which reflect the relative reliability of the mutual capacitance data and self capacitance data in determining the actual touch location. If the relationship between the mutual area and the self crossing area 40 indicates a high level of distortion of the mutual capacitance data, then the self weight $W_{self}$ will be relatively higher. Conversely, if the relationship between the mutual area and the self crossing area 40 indicates a low level of distortion of the mutual capacitance data, then the mutual weight $W_{mut}$ will be relatively higher.

Other weight value selection techniques could instead be used. As an example, another weight value selection technique may use a ratio of peak capacitance strengths to select the weight values. In this technique, the self weight $W_{self}$ would equal the maximum value within the filtered capacitance data (either self or mutual), and the mutual weight $W_{mut}$ would equal the maximum value of the filtered mutual capacitance data within the self crossing area 40. As an example of this technique in the context of the filtered data as shown in FIG. 5D, self weight $W_{self}$=1056 and mutual weight $W_{mut}$=390. Another example technique may use an average strength to select weight values. In this technique, the self weight $W_{self}$ would equal the average of the filtered self capacitance values and the mutual weight $W_{mut}$ would equal the average of the filtered mutual capacitance data within the self crossing area 40. As an example of this technique in the context of the filtered data as shown in FIG. 5D, self weight $W_{self}$=480 (from an average value of 480.70) and mutual weight $W_{mut}$=224 (from an average value of 224.03). Another example technique may use a summation of strengths to select weight values. In this technique, the self weight $W_{self}$ would equal the absolute value of the summation of the unfiltered mutual capacitance data lower than 0 within the self crossing area, and the mutual weight $W_{mut}$ would equal the summation of the unfiltered mutual capacitance data within the self crossing area 40. As an example of this technique in the context of the unfiltered data as shown in FIG. 5A with the self crossing area shown in FIG. 5D, self weight $W_{self}$=4965 and mutual weight $W_{mut}$=1730 (absolute value of −1730).

The last step in the process is the mixing of the first and second centroids as a function of the mutual weight value and self weight value in order to calculate a hybrid centroid. Any suitable technique can be used to mix the centroids. As an example, the hybrid centroid $P_{hyb}$ is determined by a weighted mixing in accordance with the following formula:

$$P_{hyb} = \frac{(W_{mut} * P_{mut} + W_{self} * P_{self})}{(W_{mut} + W_{self})}$$

In one embodiment, the mathematical operation for mixing the centroids is as follows:

The coordinates of the hybrid centroid $P_{hyb}$ are $x_{hyb}$ and $y_{hyb}$. The coordinates of the mutual capacitance data island centroid $P_{mut}$ are $x_{mut}$ and $y_{mut}$. The coordinates of the self capacitance data island centroid $P_{self}$ are $x_{self}$ and $y_{self}$.

The x coordinate $x_{hyb}$ for the hybrid centroid $P_{hyb}$ is calculated by the following formula which takes into account the determined mutual weight ($W_{mut}$) and self weight ($W_{self}$):

$$x_{hyb} = \frac{W_{mut}}{W_{mut} + W_{self}} x_{mut} + \frac{W_{self}}{W_{mut} + W_{self}} x_{self} \quad (1)$$

The y coordinate $y_{hyb}$ for the hybrid centroid $P_{hyb}$ is calculated by the following formula which takes into account the determined mutual weight ($W_{mut}$) and self weight ($W_{self}$):

$$y_{hyb} = \frac{W_{mut}}{W_{mut} + W_{self}} y_{mut} + \frac{W_{self}}{W_{mut} + W_{self}} y_{self} \quad (2)$$

In the context of the example with the mutual capacitance data and self capacitance data as shown in FIG. 5A, the coordinates of the mutual data island centroid X are $P_{mut}=(25.7, 8.75)$ and the coordinates of the self data islands centroid χ are $P_{self}=(25.8, 9.64)$. Using equations (1) and (2), the coordinates of the hybrid centroid+are $P_{hyb}=(25.7, 9.30)$ which results in a touch location as shown in FIG. 5D.

Reference is now once again made to the calculation of FIGS. 2A-2D for the single touch floating ground condition. Using the mutual capacitance data alone in accordance with prior art techniques for centroid calculation, the touch coordinates for the centroid X are $P_{sffg}=(25.6, 9.13)$. A comparison of the hybrid centroid $P_{hyb}=(25.7, 9.30)$ coordinates to the single touch centroid coordinates $P_{sffg}=(25.6, 9.13)$ reveals that the calculated hybrid centroid is much closer to the actual touch coordinates than either $P_{mut}=(25.7, 8.75)$ or $P_{self}=(25.8, 9.64)$. The error between $P_{hyb}$ and $P_{sffg}$ can be calculated as follows:

$$\text{Error}(P_{hyb}, P_{sffg}) = |P_{hyb} - P_{sffg}| = \sqrt{(x_1-x_2)^2 + (y_1-y_2)^2} \quad (3)$$

Applying the x and y coordinate values for $P_{mut}$ and $P_{sffg}$ into the error equation (3) reveals an error value of Error=0.38. Applying the x and y coordinate values for $P_{hyb}$ and $P_{sffg}$ into the error equation (3) reveals an error value of Error=0.16. Thus, the process has effectively addressed the error in touch coordinate calculation introduced by the simultaneous second touch in the floating ground condition.

The foregoing description has provided by way of exemplary and non-limiting examples a full and informative description of one or more exemplary embodiments of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

What is claimed is:

1. A method for processing a frame including mutual capacitance data and self capacitance data, comprising:
    filtering the mutual capacitance data of the frame using a first fixed threshold to define a mutual capacitance island which includes only the mutual capacitance data which exceeds the first fixed threshold;
    filtering the self capacitance data of the frame using a second fixed threshold to define a row self capacitance island and a column self capacitance island which include only the self capacitance data which exceeds the second fixed threshold;
    calculating a first centroid of the mutual capacitance island;
    calculating a second centroid of the row and column self capacitance islands; and
    weighted mixing of the first and second centroids to calculate a hybrid centroid which provides coordinates of a detected touch or hover.

2. The method of claim 1, further comprising:
    selecting a mutual weight as a function of a size of the mutual capacitance island;
    selecting a self weight as a function of a size of an area delimited by the row self capacitance island and the column self capacitance island;
    combining the first and second centroids as a function of the mutual weight and self weight to produce the hybrid centroid.

3. The method of claim 1, further comprising:
    determining a size of an area delimited by the row self capacitance island and the column self capacitance island;
    selecting a mutual weight as a function of a size of the mutual capacitance island;
    determining a self weight as a function of difference between the size and the mutual weight; and
    combining the first and second centroids as a function of the mutual weight and self weight to produce the hybrid centroid.

4. The method of claim 1, further comprising:
    selecting a self weight as a function of a maximum value of the filtered self capacitance data;
    selecting a mutual weight as a function of a maximum value of the filtered mutual capacitance data in an area delimited by the row self capacitance island and the column self capacitance island; and
    combining the first and second centroids as a function of the mutual weight and self weight to produce the hybrid centroid.

5. The method of claim 1, further comprising:
    selecting a self weight as a function of an average of the filtered self capacitance data;
    selecting a mutual weight as a function of an average of the filtered mutual capacitance data in an area delimited by the row self capacitance island and the column self capacitance island; and
    combining the first and second centroids as a function of the mutual weight and self weight to produce the hybrid centroid.

6. The method of claim 1, further comprising:
    selecting a self weight as a function of a summation of negative values of the unfiltered mutual capacitance data in an area delimited by the row self capacitance island and the column self capacitance island;
    selecting a mutual weight as a function of a summation of positive values of the unfiltered mutual capacitance data in said area delimited by the row self capacitance island and the column self capacitance island; and
    combining the first and second centroids as a function of the mutual weight and self weight to produce the hybrid centroid.

7. The method of claim 1, wherein weighted mixing comprises:
    applying a mutual weight to the first centroid to produce a weighted first centroid;
    applying a self weight to the second centroid to produce a weighted second centroid; and
    adding the weighted first centroid and weighted second centroid to produce a combined centroid.

8. The method of claim 7, further comprising dividing the combined centroid by a sum of the mutual weight and self weight to produce the hybrid centroid.

9. The method of claim 7, further comprising:
    selecting said mutual weight as a function of a size of the mutual capacitance island; and
    selecting said self weight as a function of a size of an area delimited by the row self capacitance island and the column self capacitance island.

10. The method of claim 7, further comprising:
    determining a size of an area delimited by the row self capacitance island and the column self capacitance island;

selecting said mutual weight as a function of a size of the mutual capacitance island;
determining said self weight as a function of difference between the size and the mutual weight.

11. The method of claim 7, further comprising:
selecting said self weight as a function of a maximum value of the filtered self capacitance data; and
selecting said mutual weight as a function of a maximum value of the filtered mutual capacitance data in an area delimited by the row self capacitance island and the column self capacitance island.

12. The method of claim 7, further comprising:
selecting said self weight as a function of an average of the filtered self capacitance data; and
selecting said mutual weight as a function of an average of the filtered mutual capacitance data in an area delimited by the row self capacitance island and the column self capacitance island.

13. The method of claim 7, further comprising:
selecting said self weight as a function of a summation of negative values of the unfiltered mutual capacitance data in an area delimited by the row self capacitance island and the column self capacitance island; and
selecting said mutual weight as a function of a summation of positive values of the unfiltered mutual capacitance data in said area delimited by the row self capacitance island and the column self capacitance island.

14. A control circuit for a capacitive sensing panel, wherein the control circuit is configured to be coupled to rows and columns of a capacitive sensing panel, said control circuit operating to:
collect a frame including mutual capacitance data and self capacitance data;
filter the mutual capacitance data of the frame using a first fixed threshold to define a mutual capacitance island which includes only the mutual capacitance data which exceeds the first fixed threshold;
filter the self capacitance data of the frame using a second fixed threshold to define a row self capacitance island and a column self capacitance island which include only the self capacitance data which exceeds the second fixed threshold;
calculate a first centroid of the mutual capacitance island;
calculate a second centroid of the row and column self capacitance islands; and
perform a weighted mixing of the first and second centroids to calculate a hybrid centroid which provides coordinates of a detected touch or hover.

15. The control circuit of claim 14, wherein the control circuit further operates to:
select a mutual weight as a function of a size of the mutual capacitance island;
select a self weight as a function of a size of an area delimited by the row self capacitance island and the column self capacitance island;
combine the first and second centroids as a function of the mutual weight and self weight to produce the hybrid centroid.

16. The control circuit of claim 14, wherein the control circuit further operates to:
determine a size of an area delimited by the row self capacitance island and the column self capacitance island;
select a mutual weight as a function of a size of the mutual capacitance island;
determine a self weight as a function of difference between the size and the mutual weight; and
combine the first and second centroids as a function of the mutual weight and self weight to produce the hybrid centroid.

17. The control circuit of claim 14, wherein the control circuit further operates to:
select a self weight as a function of a maximum value of the filtered self capacitance data;
select a mutual weight as a function of a maximum value of the filtered mutual capacitance data in an area delimited by the row self capacitance island and the column self capacitance island; and
combine the first and second centroids as a function of the mutual weight and self weight to produce the hybrid centroid.

18. The control circuit of claim 14, wherein the control circuit further operates to:
select a self weight as a function of an average of the filtered self capacitance data;
select a mutual weight as a function of an average of the filtered mutual capacitance data in an area delimited by the row self capacitance island and the column self capacitance island; and
combine the first and second centroids as a function of the mutual weight and self weight to produce the hybrid centroid.

19. The control circuit of claim 14, wherein the control circuit further operates to:
select a self weight as a function of a summation of negative values of the unfiltered mutual capacitance data in an area delimited by the row self capacitance island and the column self capacitance island;
select a mutual weight as a function of a summation of positive values of the unfiltered mutual capacitance data in said area delimited by the row self capacitance island and the column self capacitance island; and
combine the first and second centroids as a function of the mutual weight and self weight to produce the hybrid centroid.

20. The control circuit of claim 14, wherein the control circuit performs weighted mixing by:
applying a mutual weight to the first centroid to produce a weighted first centroid;
applying a self weight to the second centroid to produce a weighted second centroid; and
adding the weighted first centroid and weighted second centroid to produce a combined centroid.

21. The control circuit of claim 20, wherein the control circuit further operates to divide the combined centroid by a sum of the mutual weight and self weight to produce the hybrid centroid.

22. The control circuit of claim 20, wherein the control circuit further operates to:
select said mutual weight as a function of a size of the mutual capacitance island; and
select said self weight as a function of a size of an area delimited by the row self capacitance island and the column self capacitance island.

23. The control circuit of claim 20, wherein the control circuit further operates to:
determine a size of an area delimited by the row self capacitance island and the column self capacitance island;
select said mutual weight as a function of a size of the mutual capacitance island;
determine said self weight as a function of difference between the size and the mutual weight.

24. The control circuit of claim 20, wherein the control circuit further operates to:
   select said self weight as a function of a maximum value of the filtered self capacitance data; and
   select said mutual weight as a function of a maximum value of the filtered mutual capacitance data in an area delimited by the row self capacitance island and the column self capacitance island.

25. The control circuit of claim 20, wherein the control circuit further operates to:
   select said self weight as a function of an average of the filtered self capacitance data; and
   select said mutual weight as a function of an average of the filtered mutual capacitance data in an area delimited by the row self capacitance island and the column self capacitance island.

26. The control circuit of claim 20, wherein the control circuit further operates to:
   select said self weight as a function of a summation of negative values of the unfiltered mutual capacitance data in an area delimited by the row self capacitance island and the column self capacitance island; and
   select said mutual weight as a function of a summation of positive values of the unfiltered mutual capacitance data in said area delimited by the row self capacitance island and the column self capacitance island.

* * * * *